United States Patent [19]
Darby et al.

[11] 3,881,898
[45] May 6, 1975

[54] GAS TREATMENT

[75] Inventors: Kenneth Darby; Bernard Tate; Charles Graham Smith, all of Birmingham, England

[73] Assignee: Lodge-Cottrell Limited, Birmingham, England

[22] Filed: Jan. 18, 1973

[21] Appl. No.: 324,696

[52] U.S. Cl. ............... 55/223; 55/226; 55/233; 55/240; 55/257; 55/260; 55/456; 261/98; 261/116; 261/DIG. 54
[51] Int. Cl. .............................................. B01d
[58] Field of Search ............ 55/227, 223, 228, 233, 55/226, 240, 241, 257, 90, 91, 456, 457, 93, 94, 244, 260; 261/DIG. 54, 62, 98, 116, 119 R

[56] References Cited
UNITED STATES PATENTS

| | | | |
|---|---|---|---|
| 2,002,553 | 5/1935 | Somers | 55/227 |
| 2,523,126 | 9/1950 | Long | 261/114 A |
| 3,726,065 | 4/1973 | Hausberg et al. | 55/223 |
| 3,768,234 | 10/1973 | Hardison | 55/223 |

FOREIGN PATENTS OR APPLICATIONS

| | | | |
|---|---|---|---|
| 3,142,283 | 6/1929 | United Kingdom | 55/223 |
| 940,930 | 11/1963 | United Kingdom | 261/DIG. 54 |
| 1,290,363 | 9/1972 | United Kingdom | 261/DIG. 54 |

Primary Examiner—Bernard Nozick
Attorney, Agent, or Firm—Roy L. Van Winkle; John N. Hazelwood

[57] ABSTRACT

In the apparatus and method disclosed, very hot, moist gas under pressure from a blast furnace exhaust or the like is passed through a scrubber that is mounted on top of a high pressure chamber. A plurality of conduits containing venturis connect the high pressure chamber with the lower end of a low pressure chamber. The gas pressure is reduced as the gas flows through the conduits and moisture is removed due to the reversal of gas flow entering the conduits. The flow is again reversed as the gas leaves the conduits removing additional moisture. Further cooling occurs as the gas flows upwardly through filters in the low pressure chamber. To reach the exit from the apparatus, an additional reversal in gas flow direction occurs.

8 Claims, 1 Drawing Figure

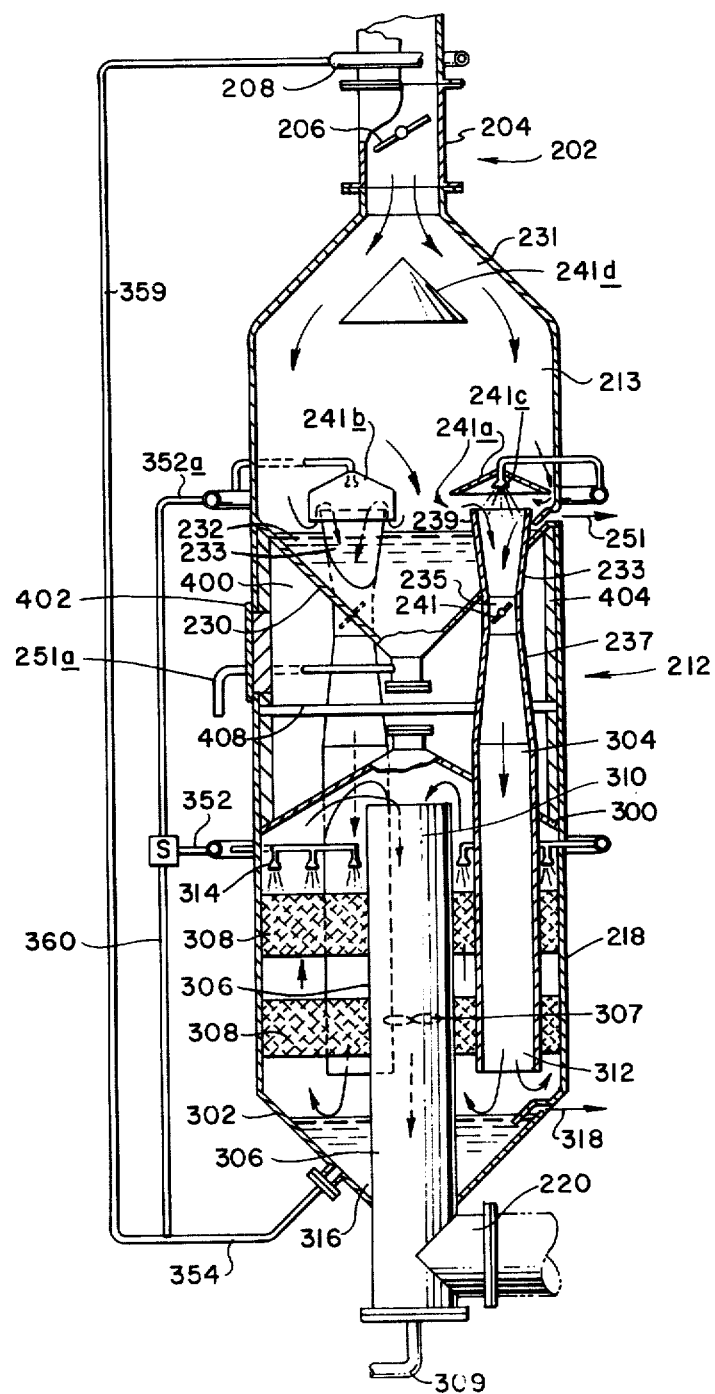

3,881,898

GAS TREATMENT

BACKGROUND OF THE INVENTION

This invention is concerned with improvements in or relating to gas treatment.

In for example the cleaning of gas, e.g. gas from a blast furnace or other melting or smelting process, or gas issuing from a steel making process which may subsequently be used as fuel gas, at times the gas is cleaned by scrubbing with water. Before discharge of the scrubbed gas to the atmosphere or other required location, entrained moisture containing dust or the like removed from the gas by the scrubbing is separated from the gas and the gas is also cooled.

The gas cleaned in apparatus according to the invention is for example gas from a blast furnace, or other melting or smelting process, or gas issuing from a steel making process which may subsequently be used as a fuel gas. If the gas is a waste gas it is for example discharged from the apparatus to a chimney stack; if the gas is to be used as a fuel gas it may pass from the apparatus to a fuel gas main, any subsequent treatment that may be necessary being carried out.

One form of gas cleaning apparatus is described in our U.K. Pat. No. 1,290,363, the entire disclosure of which is incorporated herein by reference.

With the advent of very high gas pressures in for example blast furnaces, problems have arisen in the reduction of gas pressure in the gas cleaning apparatus. For example, as well as constructional problems associated with high pressure equipment, there is an environmental problem of noise involved in sudden pressure reductions.

SUMMARY OF THE INVENTION

It is an object of the invention to provide an improved gas treatment apparatus.

The invention provides improved gas treatment apparatus comprising: an upright tower which includes (a) a high pressure chamber adapted for separation of moisture from a gas, (b) a low pressure chamber, said chambers being arranged one above the other, (c) means for cooling in the low pressure chamber the gas from which the moisture has been separated in the operation of the apparatus, (d) conduit means providing gaseous communication between the high pressure chamber and the low pressure chamber, said conduit means comprising an inlet portion which extends into the high pressure chamber, and an exit portion which extends into the low pressure chamber, and (e) gas pressure reducing means located in said conduit means.

The invention also contemplates an improved method of gas treatment for cooling and separating moisture from gas comprising the means for: supplying moist, high pressure gas to a high pressure chamber in the treating apparatus; separating the moisture from the gas; reducing the pressure of the gas from which the moisture has been separated by passing the gas from the high pressure chamber to a low pressure chamber; and, cooling the gas in the low pressure chamber.

BRIEF DESCRIPTION OF THE DRAWING

In the drawing the single FIGURE shows a sectional side view of the apparatus embodying the invention.

There now follows a description, to be read with reference to the accompanying drawing, of gas cleaning apparatus embodying the invention. This description, which is also illustrative of method aspects of the invention, is given by way of example of the invention only and not by way of limitation thereof.

DETAILED DESCRIPTION OF THE PREFERRED EMBODIMENT

The apparatus is adapted for use in cleaning a dirty gas containing dust or the like, e.g. gas from a blast furnace.

The apparatus comprises a gas scrubber 202 mounted on an upper end portion of a vertical tower 212.

The scrubber 202 comprises a vertical cylindrical tube 204 in which is mounted a circular valve flap 206 for pivotal adjusting movement about a horizontal axis to control the gas flow and pressure drop through the scrubber 202. Even in a horizontal position of the valve flap 206 there is an annular gap between the valve flap 206 and the tube 204. The gas scrubber 202 also comprises a plurality of water sprays 208 located upstream of the valve flap 206. In the operation of the apparatus gas under high pressure to be cleaned flows downwardly through the scrubber 202. The gas to be cleaned is derived from a blast furnace, or other melting or smelting process, or gas issuing from a steel making process, which may subsequently be used as a fuel gas.

The position of the valve flap 206 may be automatically controlled to give constant pressure drop thereacross.

In a modification the gas scrubber 202 is replaced by a gas scrubber corresponding in construction and arrangement with the gas scrubber described in our U.K. Pat. No. 940,930, or with one of the gas scrubbers described in our U.K. Pat. No. 1,100,275. The entire disclosure of these two specifications is also incorporated herein by reference.

The vertical tower 212 is of circular cross section; an upper portion of the tower 212 provides a high pressure vessel 213 directly above and in direct communication with the gas scrubber 202; provision is made in the vessel 213 to separate dirty moisture entrained in gas entering the vessel 213 from the scrubber 202. A lower portion of the tower 212 provides a low pressure vessel 218 in which is provided means for cooling the gas, from which the dirty moisture has been separated, by introducing cooling water directly into the gas. The tower 212 comprises a horizontal outlet 220 for cooled gas from the vessel 218; and the outlet 220 communicates with the gas main distribution system.

The high pressure vessel 213 comprises a lower inverted conical end portion 230 and a conical upper end portion 231; and a reservoir 232 to collect dirty water is defined by the conical lower end portion 230.

Three symmetrically located parallel vertical venturi tubes 233 (only two of which are shown) are mounted in the end portion 230 to provide gaseous communication from the vessel 213 to the vessel 218 and to provide for reduction in gas pressure between the vessel 213 and the vessel 218. The reservoir 232 extends around the venturi tubes 233. Each venturi tube 233 is of circular cross section and comprises a throat portion 235, a lower diverging exit portion 237, and an upper converging inlet portion 239 extending into the high pressure vessel 213. A circular valve flap 241 is located in the throat portion 235 to vary the gas flow and pressure drop through the venturi tube 233; in a horizontal position of the valve flap 241, the venturi tube 233 is completely closed or alternatively it may be arranged that in said horizontal position an annular gap remains around the flap 241. The valve flap 241 is mounted for pivotal adjusting movement on a spindle which extends across the throat portion 235 generally centrally of the cross section of the throat portion and outwardly of the tube 233 via appropriate rotary seals (not shown), and a handle (not shown) is mounted on the spindle to adjust the position of the valve flap 241 to vary the gas flow and pressure drop as required. Alternatively, means may be provided for automatic control of the valve flaps 241 in response to conditions downstream of the outlet 220 so that the pressure at the outlet 220 is maintained substantially constant. Again, alternatively, the valve flaps 241 may be controlled in response to conditions upstream of the scrubber 202 as well as or instead of conditions downstream of the outlet 220.

A shield is provided over each venturi tube 233 closely adjacent thereto and may be conical as shown at 241a or in the shape of a bubble cap as shown at 241b. The shield 241a is spaced above its venturi tube 233 but the shield 241b extends downwardly over an upper end portion of its venturi tube 233, while being annularly spaced from said tube 233. The shield 241a or 241b functions to restrain dirty water from entering the venturi tubes 233 and also to separate dirty water from the gas. The separated dirty water passes to the reservoir 232.

Downwardly directed water sprays 241c are located between the venturi tubes 233 and the shields 241a or 241b to provide an additional gas scrubbing function in the venturi tubes 233 although the primary function here is pressure reduction.

A conical gas distribution baffle 241d is located centrally in the vessel 213 between the scrubber 202 and the shields 241a or 241b, the baffle 241d being coaxial with the scrubber 202. The baffle 241d may be provided with radial ribs (not shown) upstanding from its upper surface to stabilize gas distribution.

In the operation of the apparatus upper portions of the three venturi tubes 233 are largely submerged in the water in the reservior 232, the converging portions 239 extending just above the level of the water.

An emergency overflow for the reservoir 232 is provided at 251, and a lower dirty water outlet at 251a; suitable pressure seals being provided.

The low pressure vessel 218 comprises upper and lower conical and inverted conical end portions 300, 302 respectively. Three vertical circular cylindrical tubes 304 extend through the upper conical end portion 300, are connected to the diverging portions 237 of the venturi tubes 233 and extend into the low pressure vessel 218. An axial circular cylindrical gas outlet conduit tube 306 is mounted in the lower conical end portion 302 extending from an upper portion of the vessel 218 downwardly out of the vessel 218; a propeller shaped member 307 is located in the tube 306 too separate any moisture contained in the gas entering the tube 306: the separated moisture is drained via a sealed outlet 309. The gas outlet 220 leads from the conduit 306.

The low pressure vessel 218 also contains two spaced timber packings 308 through which the tubes 304, 306 extend; an upper inlet 310 of the tube 306 extends above the packings 308 and lower outlets 312 of the tubes 304 extend below the packings 308.

A plurality of water sprays 314 extend above the packings 308. An annular reservoir 316 for spent cooling water is provided in the lower end portion 302 below the tubes 304, with an emergency overflow 318. The tubes 304 extend downwardly closely adjacent the liquid level in the reservoir 316.

In the operation of the apparatus gas from the venturi tubes 233 passes downwardly along the tubes 304 and upwardly from the tubes 304 through the packings 308 where it is cooled by countercurrent contact with clean water from the sprays 314. The cooled clean gas leaves downwardly via the tube 306 to the outlet 220.

Thus it will be realized that the gas in passing from the high pressure vessel 213 to the low pressure vessel 218 and out of the low pressure vessel follows a labarynthine path defined by the relative positions of the tubes 304, 306. The gas in passing from the tubes 304 into the low pressure vessel 218 is directed towards the water in the reservoir 316.

Clean cooling water is supplied from a source S thereof to the sprays 314 via a supply line 352 and to the sprays 241c via a line 352a and water leaves the reservoir 316 via a line 354; a proportion of this water is recycled to the sprays 208 of the scrubber 202 via a line 359 and the remainder is returned to the source via a line 360 and a filtration plant (not shown).

The end portions 230, 300 are spaced one from the other and define therebetween with a side wall portion of the tower 212 a chamber 400 which is isolated from the gas and water in the tower 212. The chamber 400 is fitted with an access door 402 in the side wall portion and thus it will be realized that access may readily be obtained to the venturi tubes 233 without shutting down operation of the apparatus, e.g. for maintenance to be carried out on bearings of the valve flaps 241.

The chamber 400 is peripherally lined internally with a sound deadening material 404 e.g. of polyurethane foam. The door 402 also has sealing arrangements around edge portions thereof which are gas tight and also sound proof.

A platform 408 is provided in the chamber 400 for workmen to stand on.

In a modification, the venturi tubes 233 are replaced by tubes of uniform circular cross section. In a further modification the timber packings 308 are omitted or replaced by fluidized contact beds comprising plastic balls.

Typically for example, the gas entering the scrubber 202 is at a pressure not greater than about 2.0 or 2.5 atmospheres gauge, the pressure drop across the scrubber 202 is between 50 and 200 inches of water gauge, e.g. between 50 and 80 inches of water gauge, the pressure in the vessel 213 is between 0.5 and 2 atmospheres gauge, the pressure drop across the venturi tubes 233 is between 0.5 and 2 atmospheres gauge, and the required pressure at the outlet 220 of the low pressure vessel is between 10 inches and 30 inches water gauge, e.g. between 12 inches and 20 inches water gauge.

At all points following the scrubber 202 up to and including the outlet 220, the gas is saturated with water vapor.

Again, typically for example, the gas entering the scrubber 202 is at a temperature not greater than about 1000°C, and the gas at the outlet is at a temperature between 20° and 35°C (or 40°C), which is within 5°C of the temperature of the cooling water. The gas entering the high pressure vessel 213 is for example at a temperature between 35°C and 40°C.

It will be realized that while the vessel 213 is of high pressure construction, this is not necessary for the remainder of the tower 212 below the vessel 213.

In a modification the low pressure vessel is provided above the high pressure vessel and the gas scrubber is provided remote from the tower being connected to the high pressure vessel by ducting. In another modification all water from the source S is supplied direct to the sprays 314 and this full water quantity is recycled from the reservoir 316 to the sprays 208 and 241c. Dirty water from the reservoir 232 and overflow from the reservoir 316 are recycled to the source S via the filtration plant.

The embodiments of the invention in which an exclusive property or privilege is claimed are defined as follows:

1. Gas treating apparatus including an upright tower having a top, a bottom and a generally cylindrical side wall extending therebetween comprising:
   a first generally conical member spaced from said top and connected to said side wall to define a high pressure chamber with said top and providing a first reservoir for collection of moisture;
   a second generally conical member located below said first conical member connected to said side wall defining a region between said conical members and spaced from said bottom defining a low pressure chamber with said bottom;
   said bottom being of generally conical shape providing a second reservoir for collection of moisture;
   a gas inlet member extending through said top into said high pressure chamber;
   conduit means having an inlet located in said high pressure chamber, extending through said first and second conical members interiorly of said side wall, and having an outlet in said low pressure chamber proximate said second reservoir;
   gas pressure reducing means located in said conduit means;
   spray means for spraying liquid into said conduit means;
   cooling means in said low pressure chamber for reducing the temperature of the gas;
   a gas outlet member extending from said low pressure chamber through said bottom and through said second reservoir, said outlet member having an inlet end located proximate said second generally conical member and an outlet end located exteriorly of said bottom; and,
   a door in said side wall between said conical members providing access to said region.

2. The apparatus of claim 1 and also including insulation located in said region whereby said region is sound insulated.

3. Gas treating apparatus including an upright tower having a top, a bottom and a generally cylindrical side wall extending therebetween comprising:
   a first generally conical member spaced from said top and connected to said side wall to define a high pressure chamber with said top and providing a first reservoir for collection of moisture;
   a second generally conical member located below said first conical member connected to said side wall defining a region between said conical members and spaced from said bottom defining a low pressure chamber with said bottom;
   said bottom being of generally conical shape providing a second reservoir for collection of moisture; a gas inlet member extending through said top into said high pressure chamber;
   conduit means having an inlet located in said high pressure chamber, extending through said first and second conical members interiorly of said side wall, and having an outlet in said low pressure chamber proximate said second reservoir;
   gas pressure reducing means located in said conduit means;
   cooling means in said low pressure chamber for reducing the temperature of the gas;
   a gas outlet member extending from said low pressure chamber through said bottom and through said second reservoir, said outlet member having an inlet end located proximate said second generally conical member and an outlet end located exteriorly of said bottom;
   shield means in said high pressure chamber located relatively close to and above the inlet of said conduit means for preventing the direct flow of gas from said gas inlet member into said conduit means; and,
   liquid spray means located in said shield means for reducing the temperature of the gas entering and flowing through said conduit means.

4. The gas treating apparatus of claim 3 and also including:
   scrubbing means on said tower for cleaning and reducing the temperature of the gas in said gas inlet member; and,
   second gas pressure reducing means located in said gas inlet member for decreasing the pressure of the gas entering the high pressure chamber.

5. The gas treating apparatus of claim 4 and also including packing located in said low pressure chamber engaging the side wall of said tower, extending across said tower, and encircling said conduit means and gas outlet member, whereby gas flowing from the outlet of said conduit means to the inlet of said gas outlet member must pass through said packing.

6. The gas treating apparatus of claim 5 wherein said cooling means in said low pressure chamber is located above said packing.

7. The gas treating apparatus of claim 6 wherein said cooling means includes water spray means.

8. The gas treating apparatus of claim 7 and also including means in fluid communication with said second reservoir and with said scrubbing means for recycling water collected in said second reservoir to said scrubbing means.

* * * * *